United States Patent
Pascual (10) Patent No.: US 12,294,578 B2
(45) Date of Patent: May 6, 2025

(54) ZERO-TRUST ATTESTATION IN CLOUD COMPUTING

(71) Applicant: Red Hat, Inc., Raleigh, NC (US)

(72) Inventor: Sergio Lopez Pascual, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 192 days.

(21) Appl. No.: 18/115,557

(22) Filed: Feb. 28, 2023

(65) Prior Publication Data

US 2024/0291815 A1   Aug. 29, 2024

(51) Int. Cl.
*H04L 29/06* (2006.01)
*H04L 9/40* (2022.01)

(52) U.S. Cl.
CPC ...... *H04L 63/0869* (2013.01); *H04L 63/0435* (2013.01); *H04L 63/20* (2013.01)

(58) Field of Classification Search
CPC ............... H04L 9/0897; H04L 63/0281; H04L 63/0435; H04L 63/20; H04L 63/086
See application file for complete search history.

(56) References Cited

U.S. PATENT DOCUMENTS

| | | | | |
|---|---|---|---|---|
| 2016/0014159 | A1* | 1/2016 | Schrecker | H04L 63/20 726/1 |
| 2016/0350534 | A1* | 12/2016 | Poornachandran | G06F 21/554 |
| 2018/0254898 | A1* | 9/2018 | Sprague | H04L 9/0637 |
| 2018/0294962 | A1* | 10/2018 | Kraemer | H04L 9/3221 |
| 2019/0243950 | A1* | 8/2019 | Soriente | G06F 9/545 |
| 2021/0111892 | A1* | 4/2021 | Vahldiek-Oberwagner | G06F 21/57 |
| 2021/0263757 | A1* | 8/2021 | Tsirkin | H04L 9/0897 |
| 2021/0303734 | A1* | 9/2021 | Tsirkin | H04L 9/0897 |
| 2021/0374234 | A1* | 12/2021 | Bursell | H04L 9/085 |
| 2021/0409199 | A1* | 12/2021 | Tsirkin | G06F 9/45558 |
| 2022/0292203 | A1* | 9/2022 | Severns-Williams | G06F 21/57 |

OTHER PUBLICATIONS

Microsoft "Zero Trust and Windows device health" published on Sep. 11, 2022 at https://learn.microsoft.com/en-us/windows/security/zero-trust-windows-device-health.
Keary "Intel's confidential computing solution for protecting cloud data is tested in healthcare" published on Sep. 28, 2022 at https://venturebeat.com/security/accenture-leidos-confidential-computing/.

* cited by examiner

*Primary Examiner* — Dao Q Ho
(74) *Attorney, Agent, or Firm* — Womble Bond Dickinson (US) LLP (57) ABSTRACT

A system and method of performing a mutual attestation procedure for a trusted execution environment (TEE) of a cloud service system. The method includes receiving, by the cloud service provider, a request to provide a trusted service to a client device. The method includes performing, by a processing device of the cloud service provider using a first TEE, a mutual attestation procedure with a second TEE to obtain a grant to execute a third TEE that is trusted by the second TEE. The method includes initiating, using the second TEE, an execution of the third TEE responsive to obtaining the grant. The method includes providing, using the third TEE, the trusted service to the client device, where the client device trusts the trusted service.

18 Claims, 7 Drawing Sheets

400 receiving, by a cloud service provider, a request to provide a trusted service to a client device
402 performing, by a processing device of the cloud service provider using a first trusted execution environment (TEE), a mutual attestation procedure with a second TEE to obtain a grant to execute a third TEE that is trusted by the second TEE
404 initiating, using the second TEE, an execution of the third TEE responsive to obtaining the grant
406 providing, using the third TEE, the trusted service to the client device, wherein the client device trusts the trusted service
408

ZERO-TRUST ATTESTATION IN CLOUD COMPUTING

TECHNICAL FIELD

The present disclosure relates generally to cloud computing and cloud service environments, and more particularly, to systems and methods of performing a mutual attestation procedure for a trusted execution environment (TEE) of a cloud service system.

BACKGROUND

Cloud service systems are infrastructure, platforms, or software that are hosted by third-party providers and made available to users through the internet. Cloud services facilitate the flow of user data from front-end clients (e.g., servers, tablets, desktops, laptops-anything on the client's end), through the internet, to the provider's systems, and back. Clients can access cloud services with nothing more than a computer, operating system, and internet connectivity or virtual private network (VPN).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A trusted execution environment (TEE) is a secure area of one or more computing resources (e.g., processor, memory, data storage). A TEE protects code and data that is loaded inside the computing resource to ensure confidentiality and integrity. Data integrity prohibits an unauthorized computing device from outside the TEE from accessing or modifying the data, while code integrity prohibits code in the TEE from being modified by the unauthorized computing device. The TEE implements unique, immutable, and confidential architectural security that provides hardware-based memory encryption to isolate specific application code and data in memory. The architectural security allows user-level code to allocate private regions of memory, called enclaves, that are protected from processes running at higher privilege levels. As such, a TEE can provide security features such as isolated execution, integrity of applications executing with the TEE, and confidentiality of their assets (e.g., data, etc.). The advantages of an isolated execution environment of the TEE are that it provides a higher level of security for trusted applications running on a computing device as compared to the security features of most operating systems.

Despite these advantages, however, there are still several problems with this technology. Specifically, the conventional TEE does not allow a client of a cloud service provider to perform a remote attestation (e.g., verification) of the TEE. As such, the client must put a certain degree of trust in their cloud service provider-a limitation that is contrary to the principles of confidential computing. Consequently, TEEs are often exposed to higher risk of attacks, which may steal application data or may also excessively consume the computing resources (e.g., memory resources, power resources, processing resources, networking resources) of the cloud service system. Thus, there is a long-felt but unsolved need to solve the problems of improving the attestation procedure of a TEE in a cloud service system.

Aspects of the present disclosure address the above-noted and other deficiencies by performing a mutual attestation procedure for a TEE of a cloud service system. Benefits of the embodiments of the present disclosure may include a protection against application data theft or protection against wastage of computing resources (e.g., memory resources, power resources, processing resources, networking resources) of the cloud service system occurred because of potential compromises otherwise.

As discussed in greater detail below, a cloud service system includes a pool (e.g., one or more) of host machines that are configured to provide several different services to the clients (via their client device) of the cloud service provider. A third-party (e.g., an organization) deploys a mutual remote attestation (MRA) system that executes a zero-trust attestation service (ZTAS) agent in a trusted execution environment (TEE) using virtualization-based confidential computing technology, such as Secure Encrypted Virtualization-Secure Nested Paging (e.g., SEV-SNP). The ZTAS agent of the MRA system provides the clients of the cloud service provider with an attestation of the service that is provided to them by the cloud service provider. The ZTAS agent is configured to be compatible with reproducible builds. The ZTAS agent loads the entire contents (e.g., executable code, measure FW, kernel, initial random-access memory (RAM) disc (initrd), etc.) of the workload in memory when building the virtual machine (VM)—this permits the attestation procedure to include the entire contents of the workload instead of just a portion of the workload. The storage can also only be used to back the attestation server database. These features of the ZTAS agent allow a client of the cloud service provider to verify the launch measurements and the behavior of the provided service by themselves, without having to rely on, for example, an administrator of the cloud service provider to manually perform the attestation procedure.

The ZTAS agent also provides several other unique features. For example, the ZTAS technology can simultaneously support several host machines of a single cloud service provider, as well as several cloud service providers by providing each host machine with its own dedicated ZTAS TEE that executes a ZTAS agent. The ZTAS agent includes the public key part of a key pair that is provided by an administrator device of the cloud service provider. The public key is part of the workload, and therefore, the ZTAS agent includes the public key in the launch measurements. The MRA provides the cloud service provider with a confidential computing software stack capable of performing mutual remote attestation based on secure communication (e.g., Hypertext Transfer Protocol Secure (HTTPS), over a computer network.

Each time, a new TEE is launched in the infrastructure (e.g., cloud service system) of the cloud service provider, a mutual attestation procedure against the ZTAS agent is enacted. During the mutual attestation procedure, a secure channel is created between the host machine's TEE and the ZTAS agent based on their respective signed (e.g., by the HW) attestation quotes and their launch measurements. If the channel is successfully created, then the ZTAS agent sends the storage secret (e.g., encrypted tokens, passwords, keys, messages, etc.) for unlocking the storage to the host machine's TEE (e.g., a Starting TEE or starting TEE).

For the mutual attestation procedure to be successful, in addition to providing valid signed attestation quotes, both parties must know each other's launch measurements. A host machine of the cloud service provider can generate the launch measurements for the ZTAS agent from the published source code (due in part to the reproducible builds) and their own data. The launch measurements and storage secrets for a host machine's TEEs are registered into the ZTAS agent. A host machine's TEE that can complete a mutual attestation with the ZTAS agent is permitted to register new launch measurements and storage secrets on it.

In an illustrative embodiment, a cloud service system (sometimes referred to as, service provider), receives a request to provide a trusted service to a client device. The cloud service system performs, using a first TEE (e.g., a bootstrap TEE), a mutual attestation procedure with a second TEE (e.g., a ZTAS TEE) of an MRA system to obtain a grant to execute a third TEE (e.g., Starting TEE) that is trusted by the second TEE. The cloud service system initiates, using the second TEE, an execution of the third TEE responsive to obtaining the grant. The cloud service system provides, using the third TEE, the trusted service to the client device, where thee client device trusts the trusted service.

Figure 1:
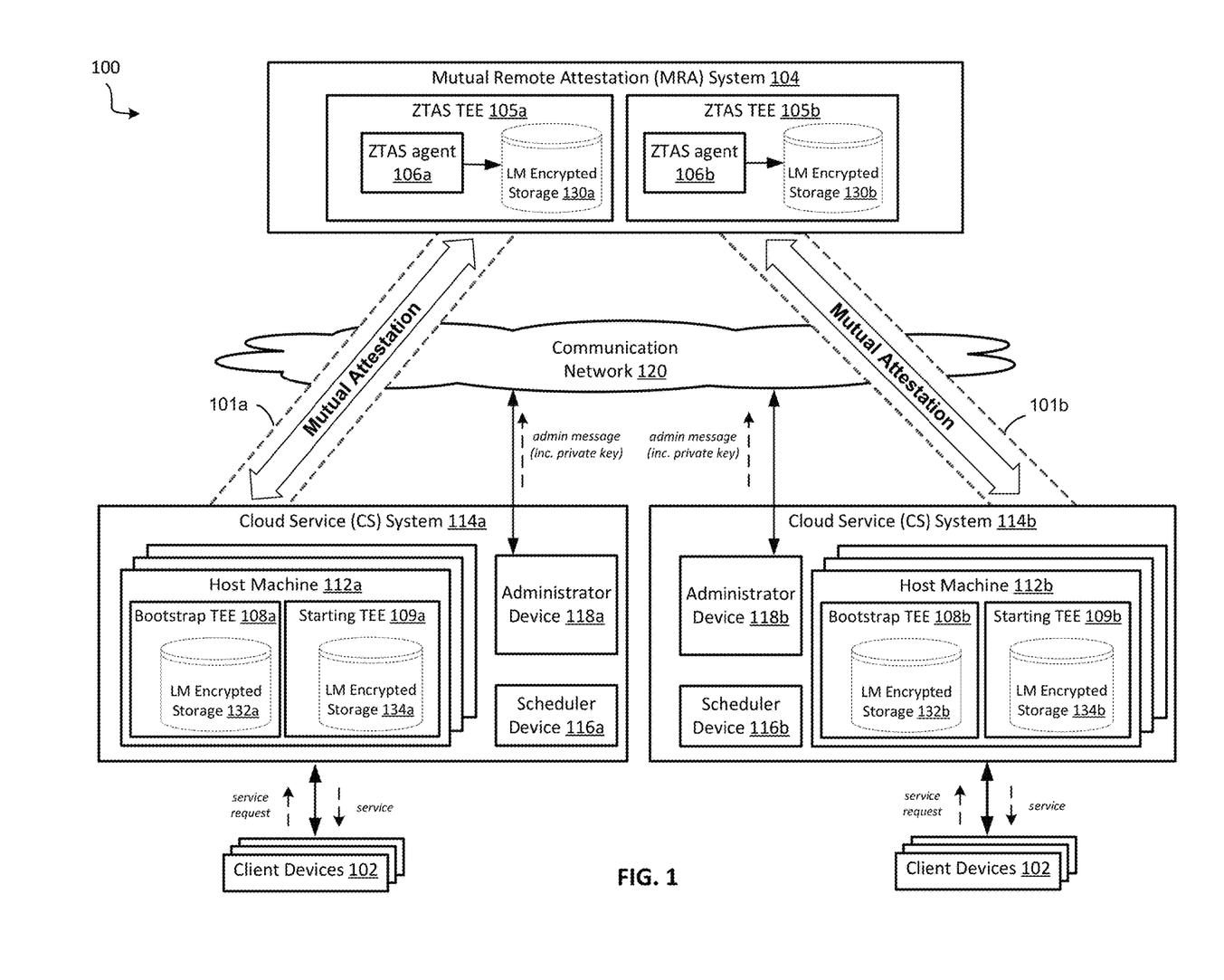
FIG. 1 is a block diagram depicting an example environment for performing a mutual attestation procedure for a trusted execution environment (TEE) of a cloud service system, according to some embodiments.

FIG. 1 is a block diagram depicting an example environment for performing a mutual attestation procedure for a trusted execution environment (TEE) of a cloud service system, according to some embodiments. The environment 100 includes a mutual remote attestation (MRA) system 104, a cloud service system 114a, a cloud service system 114b, and client devices 102, that are each communicably coupled together via the communication network 120. The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc.

The communication network 120 may carry communications (e.g., data, message, packets, frames, etc.) between any other the computing device.

Each of the cloud service systems 114 include a group of host machines 112 (e.g., host machines 112a, 112b, etc.) and a scheduler device 116 (e.g., scheduler devices 116a, 116b) that are each communicably connected to one another via the communication network 120 to form a cloud service system for providing services and/or computing resources (collectively referred to as, "services" or "cloud services") to the client device 102. The cloud service system 114 may provide any type of cloud service and/or computing resource including, for example, networking services, block storage services, computing services, object storage services, database services, communication services, deployment and management services, monitoring services, telemetry services, queuing services, collaboration services, application services, and the like. A cloud service system 114 may provide the cloud services and/or cloud resources to the client device 102 by executing one or more applications and/or user-functions. Each host machine 112 may locally store the applications and/or user-functions in storage (e.g., memory, hard drive).

The cloud service system 114 may be any type of cloud service. In some embodiments, the cloud service may be an Infrastructure-as-a-Service (IaaS) that provides users with compute, networking, and storage resources. Some examples include Open Stack, xSphere, and Azure Stack Virtual Machines. In some embodiments, the cloud service may be an Application Platform-as-a-Service (PaaS/aPaaS) that provides users with a platform on which applications can run, as well as the information technology (IT) infrastructure for it to run. Some examples include Cloud-Foundry, OpenShift, and WaveMaker RAD. In some embodiments, the cloud service may be a Software-as-a-Service (SaaS) that provides users with a cloud application, the platform on which it runs, and the platform's underlying infrastructure. An example includes BYO. In some embodiments, the cloud service may be a Function-as-a-Service (FaaS) that is an event-driven execution model that lets the developers build, run, and manage application packages as functions without maintaining the infrastructure. Some examples include OpenWhisk, Fission, and Iron.io. In some embodiments, the cloud service may be a Container Platform (CaaS) that provides users with a platform on which to execute containers. Some examples include Kubernetes, DC/OS, Docker Datacenter.

Each of the MRA system 104 and cloud service systems 114 executes one or more trusted execution environments (TEE). For example, MRA system 104 executes a TEE 105a (shown in FIG. 1 as, "ZTAS TEE 105a") and a TEE 105b (shown in FIG. 1 as, "ZTAS TEE 105b"), collectively referred to as, "ZTAS TEE 105". Host machine 112a of cloud service system 114a executes a TEE 108a (shown in FIG. 1 as, "bootstrap TEE 108a") and a TEE 109a (shown in FIG. 1 as, "Starting TEE 109a"). Host machine 112b of cloud service system 114b executes a TEE 108b (shown in FIG. 1 as, "bootstrap TEE 108b") and a TEE 109a (shown in FIG. 1 as, "Starting TEE 109b"). Each of the ZTAS TEE 105, the bootstrap (BS) TEE 108, and the Starting TEE 109 are TEEs.

As discussed above, a TEE is a secure area of one or more computing resources (e.g., processor, memory, data storage, etc.). A TEE protects code and data that is loaded inside the computing resource to ensure confidentiality and integrity. Data integrity prohibits an unauthorized computing device from outside the TEE from accessing or modifying the data, while code integrity prohibits code in the TEE from being modified by the unauthorized computing device. The TEE implements unique, immutable, and confidential architectural security that provides hardware-based memory encryption to isolate specific application code and data in memory. The architectural security allows user-level code to allocate private regions of memory, called enclaves, that are protected from processes running at higher privilege levels. As such, a TEE can provide security features such as isolated execution, integrity of applications executing with the TEE, and confidentiality of their assets (e.g., data, etc.). The advantages of an isolated execution environment of the TEE are that it provides a higher level of security for trusted applications running on a computing device as compared to the security features of most operating systems.

The MRA system 104 allocates a portion of its storage resources to create a launch measurements (LM) encrypted storage for storing launch measurements associated with each of the TEEs executing on the MRA system 104. For example, the MRA system 104 allocates a first portion of its storage resources to create LM encrypted storage 130a for ZTAS TEE 105a and a second portion of its storage resources to create LM encrypted storage 130b for ZTAS TEE 105b.

Likewise, each of the host machines 112 allocate a portion of their storage resources to create a LM encrypted storage for storing launch measurements associated with each TEE executing on the host machine 112. For example, the host machine 112a allocates a first portion of its storage resources to create LM encrypted storage 132a for BS TEE 108a and a second portion of its storage resources to create LM encrypted storage 134a for Starting TEE 109a. The host machine 112b allocates a first portion of its storage resources to create LM encrypted storage 132b for BS TEE 108b and a second portion of its storage resources to create LM encrypted storage 134b for Starting TEE 109b A launch measurement may be TBD Each of the cloud service systems 114 include an administrator device 118 (e.g., administrator devices 118a, 118b). An administrator of the cloud service system 114 may use the administrator device 118 to generate a public and private pair key for the cloud service system 114. The administrator may use the administrator device 118 to configure and/or manage (e.g., controls, operates) the cloud service system 114 to interoperate with the MRA system 104. In some embodiments, an administrator may use a host device 112 instead of the administrator device 118 to perform all administrator-related operations that are described herein. The administrator may use the cloud administrator device to send an administrator request or message (shown in FIG. 1 as, "admin message") to the MRA system 104 to request for the MRA system 104 configure the MRA system 104 to interoperate with the cloud service system 114. The admin message may include the public key and/or the private key of the administrator device 118. In response to receiving the admin request, the MRA system 104 may establish a secure channel 101 between the MRA system 104 and the cloud service system 114. For example, the MRA system 104 may establish a secure channel 101a between one or more trusted TEEs (e.g., ZTAS TEE 105a) executing on the MRA system 104 and one or more TEEs (e.g., Starting TEE 109a) executing on the host machine 112a. The MRA system 104 may establish a secure channel 101b between one or more trusted TEEs (e.g., ZTAS TEE 105b) executing on the MRA system 104 and one or more TEEs (e.g., Starting TEE 109b) executing on the host machine 112b.

The MRA system 104 executes one or more ZTAS agents 106 within each ZTAS TEE that is executing on the processor of the MRA system 104. For example, the MRA system 104 executes a ZTAS agent 106a within the ZTAS TEE 105a and a ZTAS agent 106b within the ZTAS TEE 105b. The ZTAS agent 106 perform a mutual attestation procedure for a trusted execution environment (TEE) of a cloud service system; thereby providing a layer of trust to any client devices that receive services from the cloud service system.

The MRA system 104, a host machine 112, a scheduler device 116, a client device 102, and an administrator device 118a may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may comprise a single machine or may include multiple interconnected machines (e.g., multiple servers configured in a cluster).

A host machine 112 may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). The cloud service system 114 may use the same type or different types of virtual environments. For example, all of the host machines 112 may be VMs. In another example, all of the host machines 112 may be containers. In a further example, some of the host machines 112 may be VMs, other host machines 112 may be containers, and other host machines 112 may be computing devices (or groups of computing devices).

The scheduler device 116 is configured to receive a service request from an application executing on the client device 102, determine which host machine 112 within the cloud service system 114 is able to process the service request, and forward the service request to the host machine 112 that has available resources to process the service request. Each host machine 112 is configured to send a message to the scheduler device 116 to expose an application programming interface (API) to the services, system resources (e.g., processor, storage, network, and/or cache memory, etc.), and/or application resources that are provided by the host machine 112. The scheduler device 116 determines which host machine 112 is capable of processing and/or performing the service request based on the exposure messages that the scheduler device 116 receives from each of the host machines 112 within the cloud service system 114.

Still referring to FIG. 1, the cloud service system 114, receives a request to provide a trusted service to a client device 102. The cloud service system 114 performs, using a first TEE (e.g., a bootstrap TEE 108), a mutual attestation procedure with a second TEE (e.g., a ZTAS TEE 106) of an MRA system to obtain a grant to execute a third TEE (e.g., Starting TEE 109) that is trusted by the second TEE. The cloud service system 114 initiates, using the second TEE, an execution of the third TEE responsive to obtaining the grant. The cloud service system 114 provides, using the third TEE, the trusted service to the client device 102, where thee client device 102 trusts the trusted service.

Although FIG. 1 shows only a select number of cloud service systems (e.g., cloud service systems 114) and computing devices (e.g., host machines 112, client devices 102, administrator devices 118); the environment 100 may include any number of cloud service systems and computing devices that are interconnected in any arrangement to facilitate the exchange of data between the cloud service systems and computing devices.

Figure 2A:
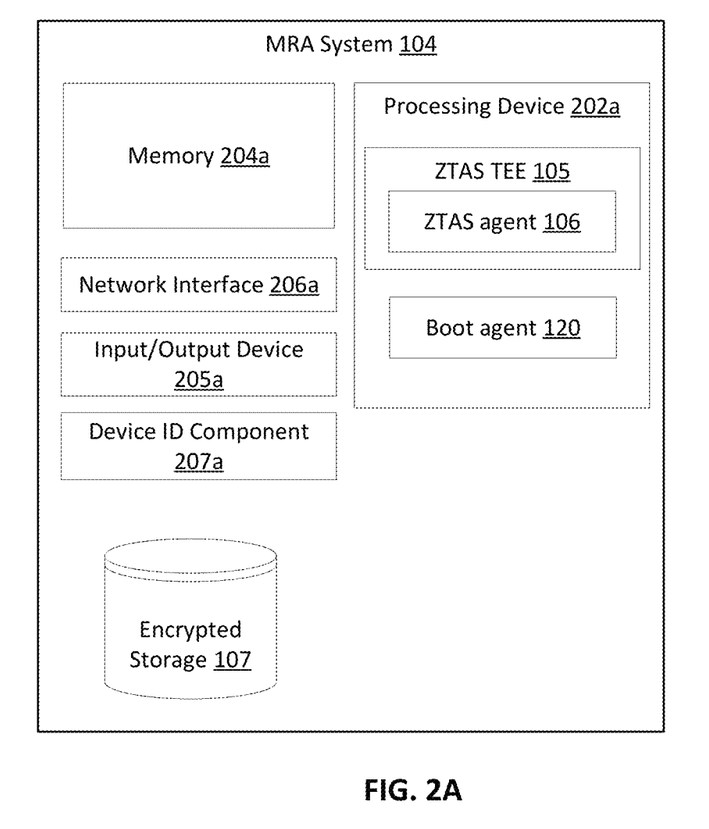
FIG. 2A is a block diagram depicting an example of the MRA system 104 in FIG. 1 implementing the zero-trust attestation agent (ZTAS) 106, according to some embodiments.

FIG. 2A is a block diagram depicting an example of the MRA system 104 in FIG. 1 implementing the zero-trust attestation agent (ZTAS) 106, according to some embodiments. While various devices, interfaces, and logic with particular functionality are shown, it should be understood that the MRA system 104 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The MRA system 104 includes a processing device 202a (e.g., general purpose processor, a PLD, etc.), which may be composed of one or more processors, and a memory 204a (e.g., synchronous dynamic random-access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the MRA system 104. In some embodiments, the processing device 202a and the memory 204a form various processing devices and/or circuits described with respect to the MRA system 104. The instructions include code from any suitable computer programming language such as, but not limited to, C, C++, C#, Java, JavaScript, VBScript, Perl, HTML, XML, Python, TCL, and Basic.

The processing device 202a may be configured to execute a ZTAS TEE 105. The processing device 202a may be configured to execute a ZTAS agent 106 within the ZTAS TEE 105 and allocate a portion of the storage resources of the MRA system 104 to create an LM encrypted storage 130 for the ZTAS agent 106. The ZTAS agent 106 may be configured to perform a mutual attestation procedure for a trusted execution environment (TEE) of a cloud service system, as follows.

The process starts by performing an initial endorsement. To register the launch measurement and storage secret for a new workload/TEE, the host machine 112 uses a TEE that is already capable of mutual attestation (that is, its launch measurements are already known by the ZTAS agent 106). However, this poses the problem of how to register the first TEE executing on the host machine 112.

To solve this problem, the ZTAS agent 106 provides a one-time API for endorsing the first TEE, also referred to herein as the bootstrap TEE 108. This process is done manually first TEE by an administrator of the CS system 114. That is, the administrator uses the administrator device 118 to generate the launch measurement and storage secret for the bootstrap TEE 108 and calling an API of the ZTAS agent 106 to register the launch measurements for the bootstrap TEE 108 with the ZTAS agent 106. During this process, instead of mutual attestation, a single-way attestation (using only the ZTAS signed quote) may be used to establish the secure channel 101.

Once the API has been consumed and the bootstrap TEE 108 has been registered with the ZTAS agent 106, the ZTAS agent 106 will not allow use of its API again. This behavior can be verified by the administrator (sometimes referred to as, a customer) by inspecting the ZTAS code, and by the fact that the binary that is built from the ZTAS code matches the launch measurements for the ZTAS TEE 105.

Once the bootstrap TEE 108 has been endorsed, it can now be launched and used to register other TEEs using the mutual attestation API. To launch the bootstrap TEE 108, a processing device initiates an execution of the bootstrap TEE 108, which causes the bootstrap TEE 108 to begin executing on a processing device.

As discussed, the ZTAS agent 106 stores launch measurements and storage secrets (e.g., encrypted tokens, passwords, keys, messages, etc.) in the LM encrypted storage MRA 130, which is a local, encrypted and, integrity verified storage. Since the MRP system 104 is unable to store the storage secret for opening the LM encrypted storage, an administration (using administrator device 118) of the CS system 114 would need to provide the password to the MRP system 104. This can be done in two ways: The bootstrap TEE 108 can hold a copy of the passphrase and provide it to the ZTAS agent 106 vie the mutual attestation API, or the host machine 112 or administrator (using administrator device 118) can manually provide the storage secret to the ZTAS agent 106 via a single-way attestation API.

The MRA system 104 performs an authentication procedure. Since launch measurements are not a secret, they cannot be relied on to authenticate accesses to the ZTAS agent 106. Furthermore, a human operator needs a way to authenticate against the initial endorsement, and in case they need to provide the storage secret again.

To authenticate accesses, during the initial creation of the ZTAS service, the administrator (using administrator device 118) or a host machine 112 may generate a public/private key pair and provide the public key portion to the MRP system 104. The public key may be included (e.g., bundled) with the ZTAS workload, thus becoming a part of the launch measurements of the ZTAS TEE 105. Accesses to the ZTAS agent 106 may require TLS authentication based on the public key. The customer uses the public key to successfully authenticate against it.

To avoid the need of putting a copy of the private key on every TEE created by the customer, the MRP system 104 may provide a proxy service that can be deployed in the bootstrap TEE 108, so other TEEs can access the ZTAS agent 106 through it. Even when the connection goes through this proxy, a secure channel is always established between the Starting TEE and the ZTAS agent 106 via the mutual attestation protocol.

Referring back to FIG. 2A, the MRA system 104 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the MRA system 104 includes a plurality of network interfaces 206a of different types, allowing for connections to a variety of networks, such as local area networks (public or private) or wide area networks including the Internet, via different sub-networks.

The MRA system 104 includes an input/output device 205a configured to receive user input from and provide information to a user. In this regard, the input/output device 205a is structured to exchange data, communications, instructions, etc. with an input/output component of the MRA system 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the MRA system 104, such as a built-in display, touch screen, microphone, etc., or external to the housing of MRA system 104, such as a monitor connected to MRA system 104, a speaker connected to MRA system 104, etc., according to various embodiments. In some embodiments, the MRA system 104 includes communication circuitry for facilitating the exchange of data, values, messages, and the like between the input/output device 205a and the components of the MRA system 104. In some embodiments, the input/output device 205a includes machine-readable media for facilitating the exchange of information between the input/output device 205a and the components of the MRA system 04. In still another embodiment, the input/output device 205a includes any combination of hardware components (e.g., a touchscreen), communication circuitry, and machine-readable media.

The MRA system 104 includes a device identification component 207a (shown in FIG. 2A as device ID component 207a) configured to generate and/or manage a device identifier associated with the MRA system 104. The device identifier may include any type and form of identification used to distinguish the MRA system 104 from other computing devices. In some embodiments, to preserve privacy, the device identifier may be cryptographically generated, encrypted, or otherwise obfuscated by any device and/or component of MRA system 104. In some embodiments, the MRA system 104 may include the device identifier in any communication (e.g., messages for mutual attestation, etc.) that the MRA system 104 sends to a computing device.

The MRA system 104 includes a bus (not shown), such as an address/data bus or other communication mechanism for communicating information, which interconnects the devices and/or components of MRA system 104, such as processing device 202a, network interface 206a, input/output device 205a, and device ID component 207a.

In some embodiments, some or all of the devices and/or components of MRA system 104 may be implemented with the processing device 202a. For example, the MRA system 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

Figure 2B:
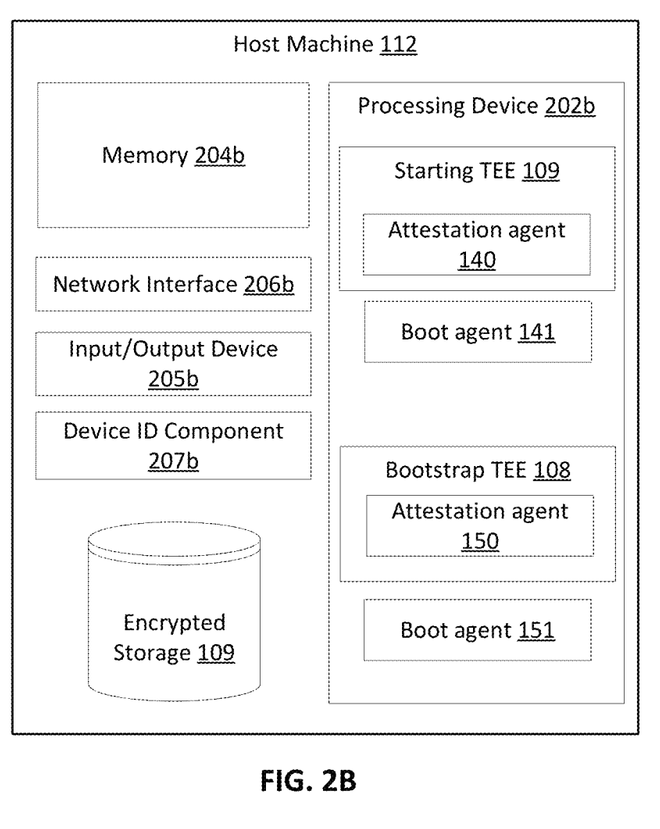
FIG. 2B is a block diagram depicting an example of the host machine 112 of the environment in FIG. 1, according to some embodiments.

FIG. 2B is a block diagram depicting an example of the host machine 112 of the environment in FIG. 1, according to some embodiments. While various devices, interfaces, and logic with particular functionality are shown, it should be understood that the host machine 112 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The host machine 112 includes a processing device 202b (e.g., general purpose processor, a PLD, etc.), which may be composed of one or more processors, and a memory 204b (e.g., synchronous dynamic random-access memory (DRAM), read-only memory (ROM)), which may communicate with each other via a bus (not shown). The processing device 202b includes identical or nearly identical functionality as processing device 202a in FIG. 2a, but with respect to devices and/or components of the host machine 112 instead of devices and/or components of the MRA system 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the host machine 112 instead of devices and/or components of the MRA system 104.

The processing device 202b may be configured to execute a boot agent 151 and a bootstrap TEE 108, which in turn executes an attestation agent 150. The processing device 202b may be configured to execute a boot agent 141 and a bootstrap TEE 109, which in turn executes an attestation agent 140. Each of the boot agent 151, bootstrap TEE 108, attestation agent 150, boot agent 141, bootstrap TEE 109, and attestation agent 140 may be configured to perform onr or more operations of the procedure 300 in FIG. 3.

The host machine 112 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the host machine 112 instead of devices and/or components of the MRA system 104.

The host machine 112 includes an input/output device 205b configured to receive user input from and provide information to a user. In this regard, the input/output device 205b is structured to exchange data, communications, instructions, etc. with an input/output component of the host machine 112. The input/output device 205b includes identical or nearly identical functionality as input/output device 205a in FIG. 2A, but with respect to devices and/or components of the host machine 112 instead of devices and/or components of the MRA system 104.

The host machine 112 includes a device identification component 207b (shown in FIG. 2B as device ID component 207b) configured to generate and/or manage a device identifier associated with the host machine 112. The device ID component 207b includes identical or nearly identical functionality as device ID component 207a in FIG. 2A, but with respect to devices and/or components of the host machine 112 instead of devices and/or components of the MRA system 104.

The host machine 112 includes a bus (not shown), such as an address/data bus or other communication mechanism for communicating information, which interconnects the devices and/or components of the host machine 112, such as processing device 202b, network interface 206b, input/output device 205b, and device ID component 207b.

In some embodiments, some or all of the devices and/or components of host machine 112 may be implemented with the processing device 202b. For example, the host machine 112 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figure 2C:
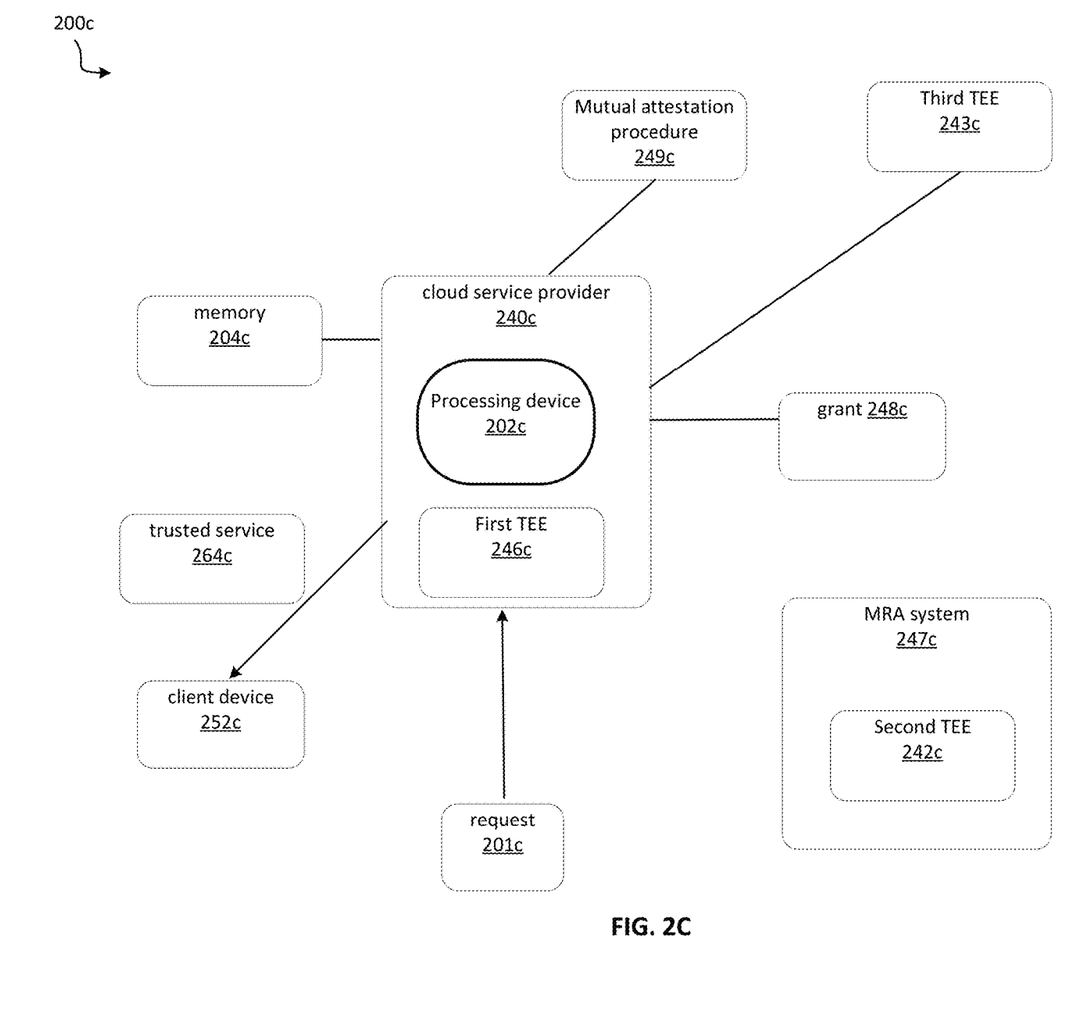
FIG. 2C is a block diagram depicting an example environment for using an MRA system, according to some embodiments.

FIG. 2C is a block diagram depicting an example environment for using an MRA system, according to some embodiments. The processing device 202c of a cloud service provider 240c (e.g., cloud service system 114) is operatively coupled to the memory 204c. The processing device 202c receives a request 201c to provide a trusted service 264c to a client device 252c. The processing device 202c performs, using a first TEE 246c, a mutual attestation procedure 249c with a second TEE 242c of an MRA system 247c to obtain a grant 248c to execute a third TEE 243c that is trusted by the second TEE 242c. The processing device 202c initiates, using the second TEE 242c, an execution of the third TEE 243c responsive to obtaining the grant 24. The processing device 202c provides, using the third TEE 243c, the trusted service 264c to the client device 252c, where the client device 252c trusts the trusted service 264c.

Figure 3A:
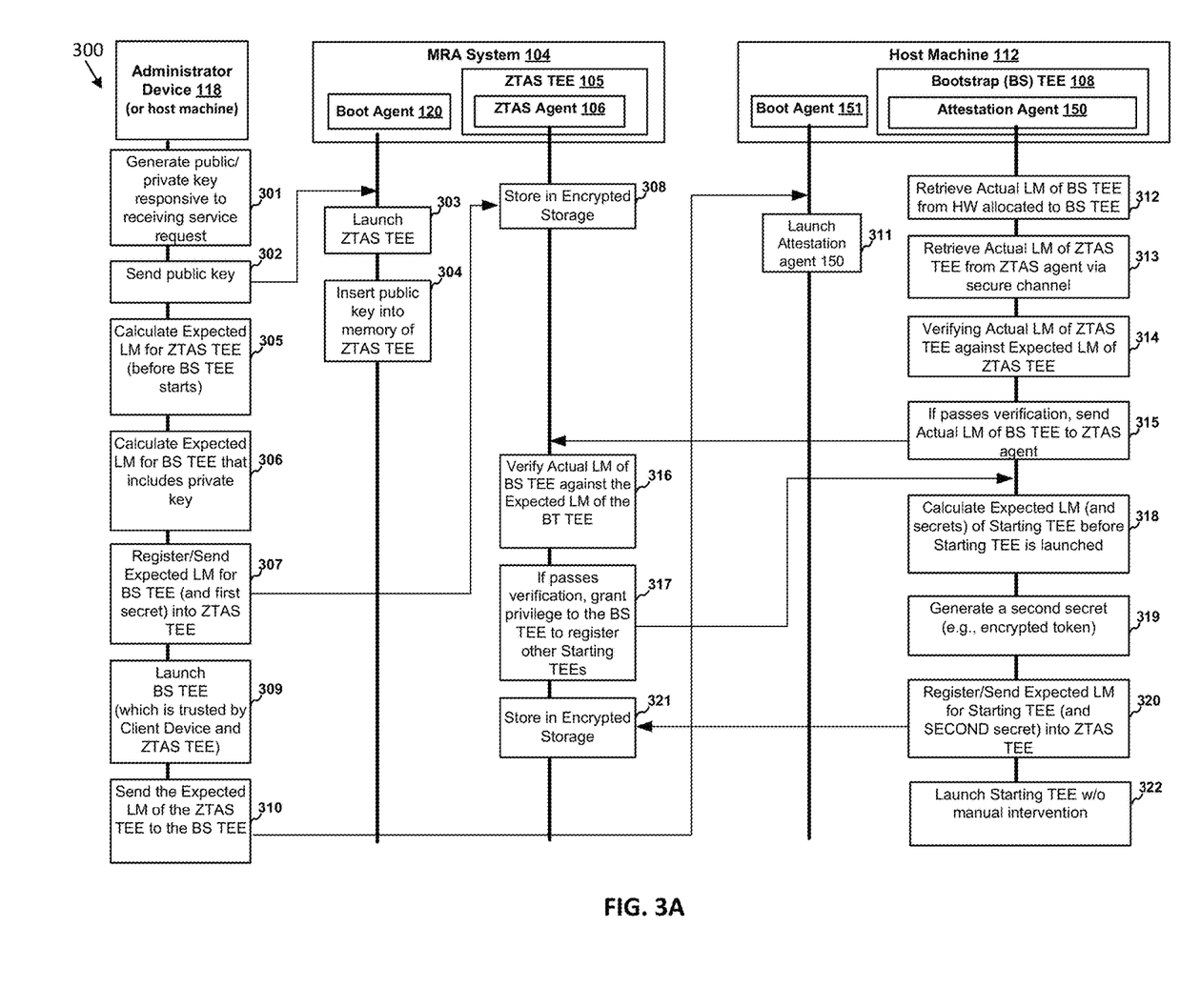
FIGS. 3A-3B are signaling diagrams depicting a procedure 300 for performing a mutual attestation procedure for a trusted execution environment (TEE) of a cloud service system, according to some embodiments.
Figure 3B:
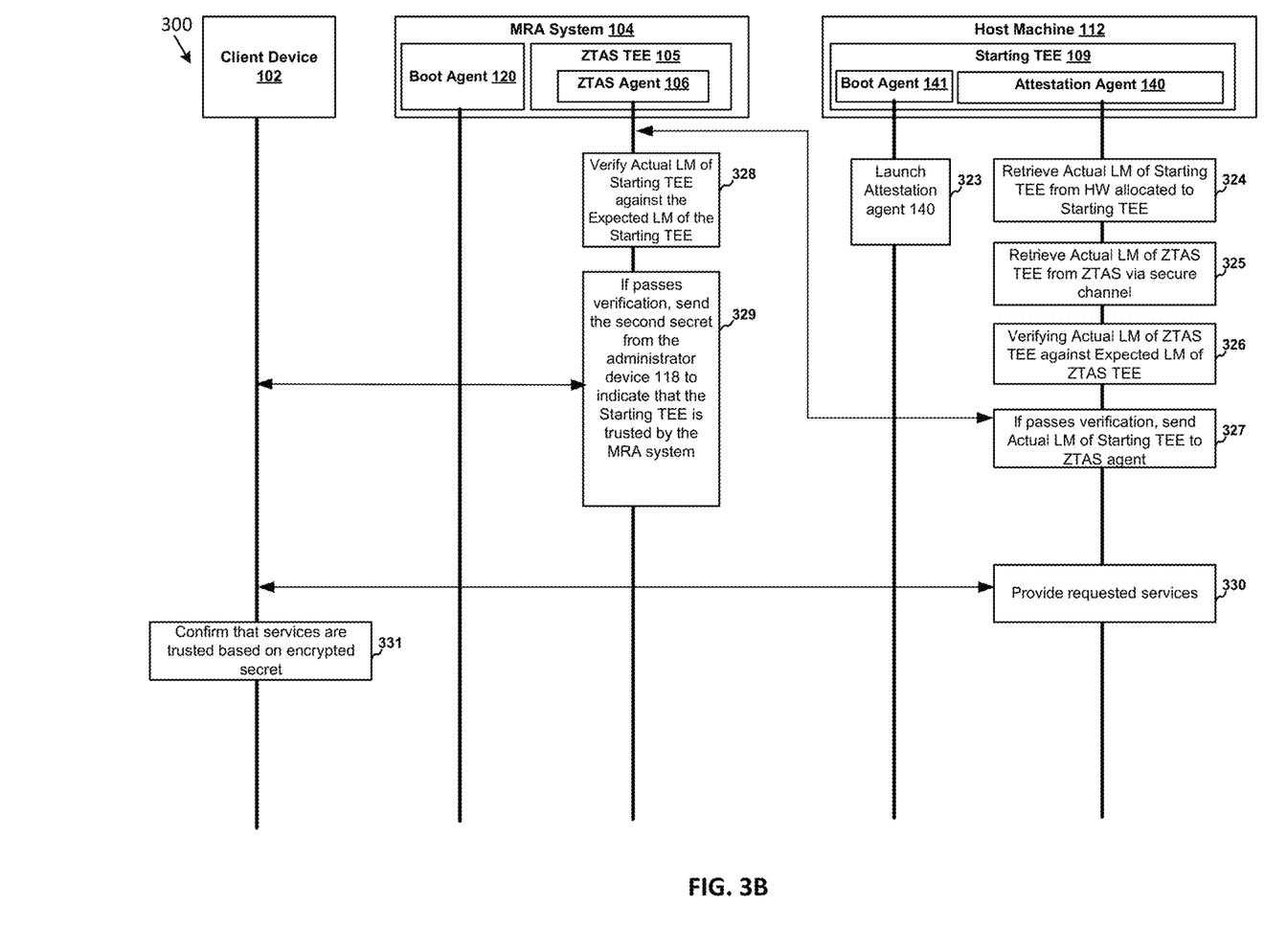

FIGS. 3A-3B are signaling diagrams depicting a procedure 300 for performing a mutual attestation procedure for a trusted execution environment (TEE) of a cloud service system, according to some embodiments. The signaling diagram shows the signals and operations of the MRA system 104, the computing devices (e.g., host machines 112, administrator devices 118) of the cloud service system 114 (e.g., cloud service system 114a or cloud service system 114b), and the client devices 102. The MRA system 104 executes a boot agent 120 and a ZTAS TEE 105, which in turn, executes a ZTAS agent 106. The host machine 112 executes a boot agent 151 and a bootstrap (BS) TEE 108, which in turn, executes an attestation agent 150.

At operation 301, the administrator device 118 of the cloud service system 114 generates a public key/private key pair responsive to receiving a service request from the client device 102. At operation 302, the administrator device 118 sends the public key of the public key/private key pair to the boot agent 120 of the MRA system 104. At operation 303, the boot agent 120 launches the ZTAS TEE 105. At operation 304, the boot agent 120 inserts the public key into the memory (e.g., memory 204a) that is associated with the ZTAS TEE 105.

At operation 305, the administrator device 118 calculates (e.g., measures) an expected LM for the ZTAS TEE 105. In some embodiments, operation 305 occurs prior to the launch and execution of the BS TEE 108 on the host machine 112. At operation 306, the administrator device 118, calculates an expected LM for the BS TEE 108 and includes (e.g., inserts, embeds) or attaches (e.g., appends, links) the private key of the cloud service system 114 in/to the expected LM for the BS TEE 108. At operation 307, the administrator device 118 registers the expected LM for the BS TEE 108 and a first secret (e.g., encrypted tokens, passwords, keys, messages, etc.) into the ZTAS TEE 105. For example, the administrator device 1108 sends the expected LM for the BS TEE 108 and/or the first secret to the ZTAS TEE 105, which causes the ZTAS agent 106 (at operation 308) to store the expected LM and/or the first secret in the LM encrypted storage 130 of the ZTAS TEE 105.

At operation 309, the administrator device 118 launches the BS TEE 108. The client device 102 and the ZTAS TEE 105 both trust the BS TEE 108 because the expected LM for the BS TEE 108 and/or the first secret are registered with the ZTAS TEE 105.

At operation 310, the administrator device 118 sends the expected LM of the ZTAS TEE 105 to the BS TEE 108.

At operation 311, the boot agent 151 of the host machine 112 launches the attestation agent 150 of the BS TEE 108.

At operation 312, the attestation agent 150 of the BS TEE 108 retrieves the actual LM of the BS TEE 108 from the resources (e.g., hardware, software, etc.) that is allocated to the BS TEE 108.

At operation 313, the attestation agent 150 retrieves the actual LM of the ZTAS TEE 105 from the ZTAS agent 106 via a secure channel 101 between the ZTAS TEE 105 and the host machine 112 that executes the attestation agent 150. The ZTAS TEE 105 and/or the host machine 112 establish the secure channel 101 as part of the mutual attestation procedure. A secure channel may be any type of secure connection including, for example, HTTP/TLS, HTTPS, and HTTPA.

At operation 314, the attestation agent 150 verifies the actual LM of the ZTAS TEE 105 against the expected LM of the ZTAS TEE 105. If the verification fails, then the attestation agent 150 of the BS TEE 108 will stop (e.g., terminate) communicating with the ZTAS agent 106 because it does not trust the ZTAS agent 106. In some embodiments, the attestation agent 150 may disconnect (e.g., break the secure channel 101) from the ZTAS agent 106. However, if the verification passes, then at operation 315, the attestation agent 150 sends the actual LM of the BS TEE 108 to the ZTAS agent 106.

At operation 316, the ZTAS agent 106 verifies the actual LM of the BS TEE 108 against the expected LM of the BS TEE 108. If the verification fails, then the ZTAS agent 106 prevents the BS TEE 108 from trying to register other TEEs (e.g., Starting TEE 109). In some embodiments, the attestation agent 150 may disconnect (e.g., break the secure channel 101) from the ZTAS agent 106. However, if the verification passes, then at operation 317, the ZTAS agent 106 grants the BS TEE 108 the privilege to register other TEEs (e.g., Starting TEE 109).

At operation 318, the attestation agent 150 calculates an expected LM (and secrets) of Starting TEE before Starting TEE 109 is launched. At operation 319, the attestation agent 150 of the BS TEE 108 generates a SECOND secret (e.g., encrypted tokens, passwords, keys, messages, etc.). At operation 320, the attestation agent 150 registers the expected LM for the Starting TEE 109 and the SECOND secret into the ZTAS TEE 105. For example, the attestation agent 150 sends the expected LM for the Starting TEE 109 and the SECOND secret to the ZTAS TEE 105, which causes the ZTAS TEE 105 (at operation 321) to store the expected LM for the Starting TEE 109 and the SECOND secret in the LM encrypted storage 130 of the ZTAS TEE 105.

At operation 322, the attestation agent 150 launches the Starting TEE 322 without using manual intervention from an administrator using the administrator device 118.

At operation 323, the boot agent 141 of the Starting TEE 109 launches the attestation agent 140 of the Starting TEE 109. At operation 324, the attestation agent 140 of the Starting TEE 109 retrieves the actual LM of the Starting TEE 109 from the resources (e.g., hardware, software, etc.) of the host machine 112 that are allocated to the Starting TEE 109. At operation 325, the attestation agent 140 of the Starting TEE 109 retrieves the actual LM of the ZTAS TEE 105 from the ZTAS agent 106 via the secure channel 101 (e.g., HTPPA).

At operation 326, the attestation agent 140 verifies the actual LM of the ZTAS TEE 105 against the expected LM of the ZTAS TEE 105. If the verification fails, then the attestation agent 140 of the Starting TEE 109 will stop communicating with the ZTAS agent 106 because it does not trust the ZTAS agent 106. In some embodiments, the attestation agent 140 may disconnect (e.g., break a secure channel 101) from the ZTAS agent 106. However, if the verification passes, then at operation 327, the attestation agent 140 sends the actual LM of the Starting TEE 109 to the ZTAS agent 106.

At operation 328, the ZTAS agent 106 verifies the actual LM of the Starting TEE 109 against the expected LM of the Starting TEE 109. If the verification fails, then the ZTAS agent 106 will stop communicating with the Starting TEE 109 because it does not trust the Starting TEE 109. However, if the verification passes, then at operation 329, the ZTAS agent 106 sends the second secret (e.g., encrypted token) from the administrator device 118 to the client device 102, where the second secret indicates to the client device 102 that the Starting TEE 109 is trusted by the MRA system 104.

At operation 330, the attestation agent 140 instructs the host machine 112 to provide the service to the client device 102 according to the service request.

At operation 331, the client device uses the second secret to confirm that the received services are trusted by the MRA system 104.

Figure 4:
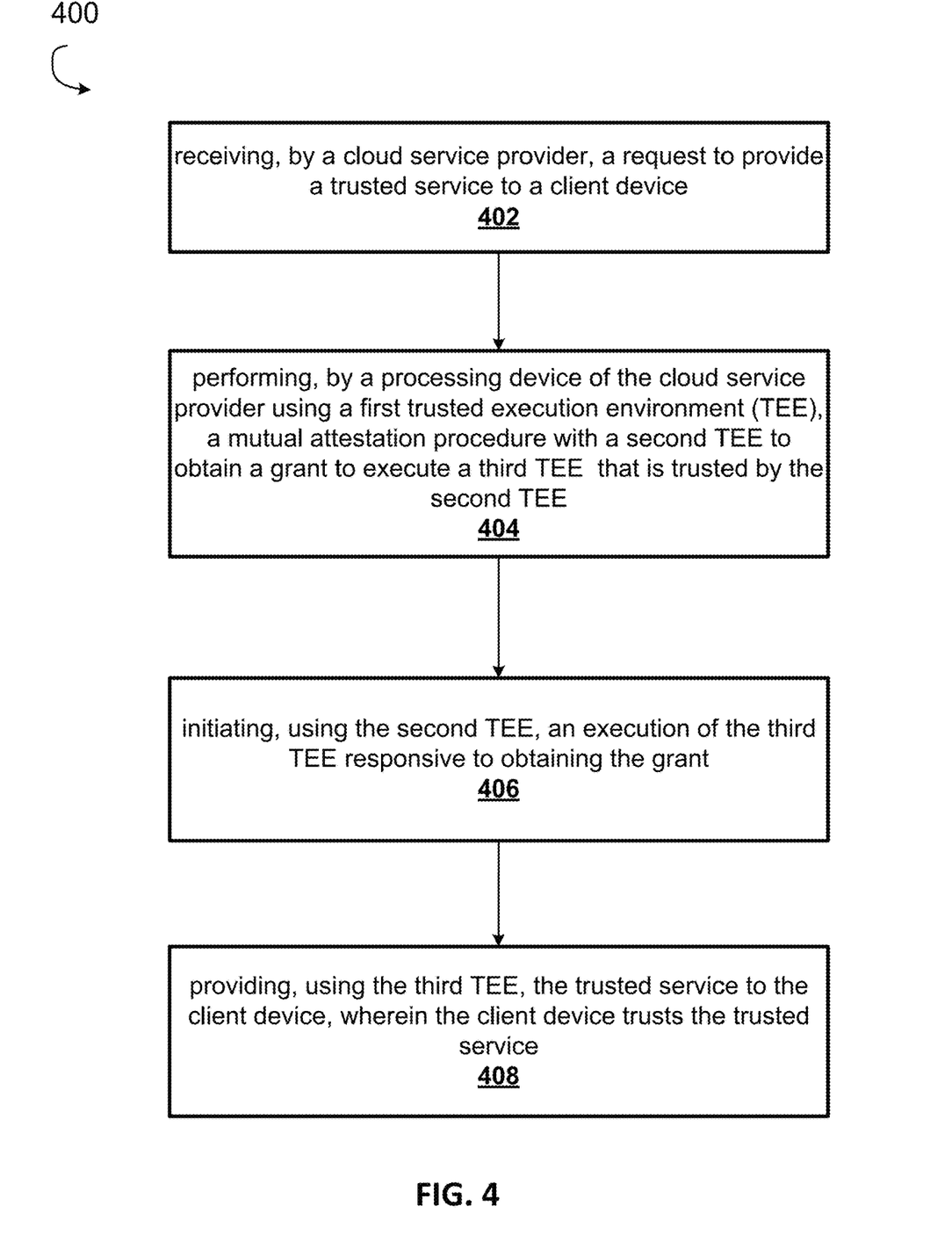
FIG. 4 is a flow diagram depicting a method of performing a mutual attestation procedure for a trusted execution environment (TEE) of a cloud service system, according to some embodiments.

FIG. 4 is a flow diagram depicting a method of performing a mutual attestation procedure for a trusted execution environment (TEE) of a cloud service system, according to some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 400 may be performed by one or more host machines, such as host machines 112 in FIG. 1. In some embodiments, method 400 may be performed by a cloud service system, such as cloud service system 114 in FIG. 1. In some embodiments, method 400 may be performed by an MRA system, such as MRA system 104 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of receiving, by a cloud service provider, a request to provide a trusted service to a client device. The method 400 includes the block 404 of performing, by a processing device of the cloud service provider using a first trusted execution environment (TEE), a mutual attestation procedure with a second TEE to obtain a grant to execute a third TEE that is trusted by the second TEE. The method 400 includes the block 406 of initiating, using the second TEE, an execution of the third TEE responsive to obtaining the grant system, wherein the security sensor is without access rights to a kernel of the operating system. The method 400 includes the block 408 of providing, using the third TEE, the trusted service to the client device, wherein the client device trusts the trusted service.

Figure 5:
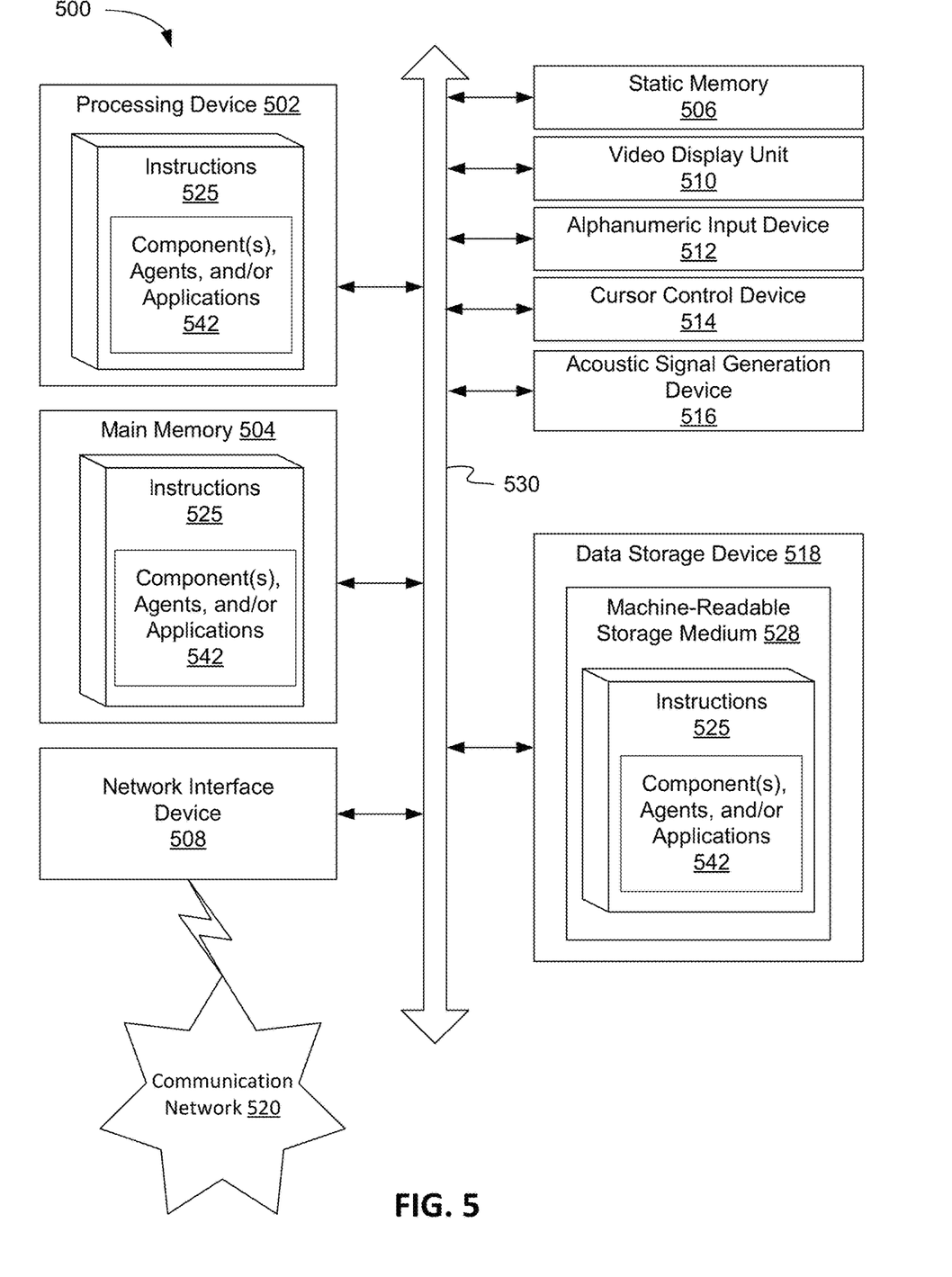
FIG. 5 is a block diagram of an example computing device 500 that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components/agents/applications 542 for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising receiving, by a cloud service provider, a request to provide a trusted service to a client device; performing, by a processing device of the cloud service provider using a first trusted execution environment (TEE), a mutual attestation procedure with a second TEE of an MRA system to obtain a grant to execute a third TEE that is trusted by the second TEE; initiating, using the second TEE, an execution of the third TEE responsive to obtaining the grant; and providing, using the third TEE, the trusted service to the client device, wherein the client device trusts the trusted service.

Example 2 is a method of Example 1, further comprising calculating an expected launch measurement (LM) of the second TEE executing on the MRA system.

Example 3 is the method of any of Examples 1-2, further comprising acquiring, using the first TEE, an actual LM of the second TEE via a secure channel; and verifying, using the first TEE, an integrity of the second TEE based on the actual LM of the second TEE and the expected LM of the second TEE.

Example 4 is the method of any of Examples 1-3, further comprising providing, using the first TEE, an actual LM of the first TEE to the second TEE responsive to verifying the integrity of the second TEE.

Example 5 is the method of any of Examples 1-4, further comprising acquiring, using the first TEE, the actual LM of the first TEE from resources allocated to the first TEE.

Example 6 is the method of any of Examples 1-5, further comprising calculating, using the first TEE, an expected launch measurement (LM) of the third TEE prior to initiating the execution of the third TEE; generating, using the first TEE, an encrypted message; and registering, using the first TEE, the expected LM of the third TEE and the encrypted message with the second TEE prior to initiating the execution of the third TEE.

Example 7 is the method of any of Examples 1-6, further comprising acquiring an actual launch measurement (LM) of the third TEE from resources allocated to the third TEE; acquiring an actual LM of the second TEE using a secure channel (e.g., HTTPA); and verifying, using the third TEE, an integrity of the second TEE based on the actual LM of the second TEE and the expected LM of the second TEE.

Example 8 is the method of any of Examples 1-7, further comprising providing the actual LM of the third TEE to the second TEE responsive to verifying the integrity of the second TEE.

Example 9 is the method of any of Examples 1-8, wherein providing the actual LM of the third TEE to the second TEE causes the second TEE to send, to the client device, an encrypted message indicating that the second TEE trusts the third TEE.

Example 10 is the method of any of Examples 1-9, further comprising performing a remedial action indicating that the third TEE does not trust the second TEE responsive to verifying the integrity of the second TEE.

Example 11 is a system comprising a memory; and a processing device, operatively coupled to the memory, to receive a request to provide a trusted service to a client device; perform, using a first trusted execution environment (TEE), a mutual attestation procedure with a second TEE of an MRA system to obtain a grant to execute a third TEE that is trusted by the second TEE; initiate, using the second TEE, an execution of the third TEE responsive to obtaining the grant; and provide, using the third TEE, the trusted service to the client device, wherein the client device trusts the trusted service.

Example 12 is the system of Example 11, wherein the processing device is further to calculate an expected launch measurement (LM) of the second TEE executing on the MRA system.

Example 13 is the system of any of Examples 11-12, wherein the processing device is further to acquire, using the first TEE, an actual LM of the second TEE via a secure channel; and verify, using the first TEE, an integrity of the second TEE based on the actual LM of the second TEE and the expected LM of the second TEE.

Example 14 is the system of any of Examples 11-13, wherein the processing device is further to: provide, using the first TEE, an actual LM of the first TEE to the second TEE responsive to verifying the integrity of the second TEE.

Example 15 is the system of any of Examples 11-14, wherein the processing device is further to acquire, using the first TEE, the actual LM of the first TEE from resources allocated to the first TEE.

Example 16 is the system of any of Examples 11-15, wherein the processing device is further to calculate, using the first TEE, an expected launch measurement (LM) of the third TEE prior to initiating the execution of the third TEE; generate, using the first TEE, an encrypted message; and register, using the first TEE, the expected LM of the third TEE and the encrypted message with the second TEE prior to initiating the execution of the third TEE.

Example 17 is the system of any of Examples 11-16, wherein the processing device is further to acquire an actual launch measurement (LM) of the third TEE from resources allocated to the third TEE; acquire an actual LM of the second TEE using a secure channel (e.g., HTTPA); and verify, using the third TEE, an integrity of the second TEE based on the actual LM of the second TEE and the expected LM of the second TEE.

Example 18 is the system of any of Examples 11-17, provide the actual LM of the third TEE to the second TEE responsive to verifying the integrity of the second TEE.

Example 19 is the system of any of Examples 11-18, wherein to provide the actual LM of the third TEE to the second TEE causes the second TEE to send, to the client device, an encrypted message indicating that the second TEE trusts the third TEE, and wherein the processing device is further to perform a remedial action indicating that the third TEE does not trust the second TEE responsive to verifying the integrity of the second TEE.

Example 20 is a non-transitory computer-readable medium storing instructions that, when execute by a processing device, cause the processing device to receive, by a cloud service provider, a request to provide a trusted service to a client device; perform, by the processing device using a first trusted execution environment (TEE), a mutual attestation procedure with a second TEE of an MRA system to obtain a grant to execute a third TEE that is trusted by the second TEE; initiate, using the second TEE, an execution of the third TEE responsive to obtaining the grant; and provide, using the third TEE, the trusted service to the client device, wherein the client device trusts the trusted service.

Example 21 is an apparatus comprising means for performing, by a processing device of the cloud service provider using a first trusted execution environment (TEE), a mutual attestation procedure with a second TEE of an MRA system to obtain a grant to execute a third TEE that is trusted by the second TEE; initiating, using the second TEE, an execution of the third TEE responsive to obtaining the grant; and providing, using the third TEE, a trusted service to a client device, wherein the client device trusts the trusted service.

Example 22 is the apparatus of Example 21, further comprising means for calculating an expected launch measurement (LM) of the second TEE executing on the MRA system.

Example 23 is the apparatus of any of Examples 21-22, further comprising means for acquiring, using the first TEE, an actual LM of the second TEE via a secure channel; and verifying, using the first TEE, an integrity of the second TEE based on the actual LM of the second TEE and the expected LM of the second TEE.

Example 24 is the apparatus of any of Examples 1-3, further comprising means for providing, using the first TEE, an actual LM of the first TEE to the second TEE responsive to verifying the integrity of the second TEE.

Example 25 is the apparatus of any of Examples 1-4, further comprising means for acquiring, using the first TEE, the actual LM of the first TEE from resources allocated to the first TEE.

Example 26 is the apparatus of any of Examples 1-5, further comprising means for calculating, using the first TEE, an expected launch measurement (LM) of the third TEE prior to initiating the execution of the third TEE; generating, using the first TEE, an encrypted message; and registering, using the first TEE, the expected LM of the third TEE and the encrypted message with the second TEE prior to initiating the execution of the third TEE.

Example 27 is the apparatus of any of Examples 1-6, further comprising means for acquiring an actual launch measurement (LM) of the third TEE from resources allocated to the third TEE; acquiring an actual LM of the second TEE using a secure channel (e.g., HTTPA); and verifying, using the third TEE, an integrity of the second TEE based on the actual LM of the second TEE and the expected LM of the second TEE.

Example 28 is the apparatus of any of Examples 1-7, further comprising means for providing the actual LM of the third TEE to the second TEE responsive to verifying the integrity of the second TEE.

Example 29 is the apparatus of any of Examples 1-8, wherein providing the actual LM of the third TEE to the second TEE causes the second TEE to send, to the client device, an encrypted message indicating that the second TEE trusts the third TEE.

Example 30 is the apparatus of any of Examples 1-9, further comprising means for performing a remedial action indicating that the third TEE does not trust the second TEE responsive to verifying the integrity of the second TEE.

Unless specifically stated otherwise, terms such as "receiving," "performing," "initiating," "providing," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, by a cloud service provider, a request to provide a trusted service to a client device;
performing, by a processing device of the cloud service provider using a first trusted execution environment (TEE), a mutual attestation procedure with a second TEE to obtain a grant to execute a third TEE that is trusted by the second TEE;
calculating, using the first TEE, an expected launch measurement (LM) of the third TEE;
generating, using the first TEE, an encrypted message;
registering, using the first TEE, the expected LM of the third TEE and the encrypted message with the second TEE;
initiating, using the second TEE, an execution of the third TEE responsive to obtaining the grant;
providing, using the third TEE, the trusted service to the client device, wherein the client device trusts the trusted service.

2. The method of claim 1, further comprising:
calculating an expected launch measurement (LM) of the second TEE executing on a computing device.

3. The method of claim 2, further comprising:
acquiring, using the first TEE, an actual LM of the second TEE via a secure channel; and
verifying, using the first TEE, an integrity of the second TEE based on the actual LM of the second TEE and the expected LM of the second TEE.

4. The method of claim 3, further comprising:
providing, using the first TEE, an actual LM of the first TEE to the second TEE responsive to verifying the integrity of the second TEE.

5. The method of claim 4, further comprising:
acquiring, using the first TEE, the actual LM of the first TEE from resources allocated to the first TEE.

6. The method of claim 1, further comprising:
acquiring an actual launch measurement (LM) of the third TEE from resources allocated to the third TEE;
acquiring an actual LM of the second TEE using a secure channel (e.g., HTTPA); and
verifying, using the third TEE, an integrity of the second TEE based on the actual LM of the second TEE and the expected LM of the second TEE.

7. The method of claim 6, further comprising:
providing the actual LM of the third TEE to the second TEE responsive to verifying the integrity of the second TEE.

8. The method of claim 6, wherein providing the actual LM of the third TEE to the second TEE causes the second TEE to send, to the client device, a second encrypted message indicating that the second TEE trusts the third TEE.

9. The method of claim 6, further comprising:
performing a remedial action indicating that the third TEE does not trust the second TEE responsive to verifying the integrity of the second TEE.

10. A system comprising:
a memory; and
a processing device of a cloud service provider, the processing device is operatively coupled to the memory, to:
receive a request to provide a trusted service to a client device;

perform, using a first trusted execution environment (TEE), a mutual attestation procedure with a second TEE to obtain a grant to execute a third TEE that is trusted by the second TEE;

calculate, using the first TEE, an expected launch measurement (LM) of the third TEE prior to initiating the execution of the third TEE;

generate, using the first TEE, an encrypted message;

register, using the first TEE, the expected LM of the third TEE and the encrypted message with the second TEE prior to initiating the execution of the third TEE;

initiate, using the second TEE, an execution of the third TEE responsive to obtaining the grant; and provide, using the third TEE, the trusted service to the client device, wherein the client device trusts the trusted service.

11. The system of claim 10, wherein the processing device is further to:

calculate an expected launch measurement (LM) of the second TEE executing on a computing device.

12. The system of claim 11, wherein the processing device is further to:

acquire, using the first TEE, an actual LM of the second TEE via a secure channel; and verify, using the first TEE, an integrity of the second TEE based on the actual LM of the second TEE and the expected LM of the second TEE.

13. The system of claim 12, wherein the processing device is further to:

provide, using the first TEE, an actual LM of the first TEE to the second TEE responsive to verifying the integrity of the second TEE.

14. The system of claim 13, wherein the processing device is further to:

acquire, using the first TEE, the actual LM of the first TEE from resources allocated to the first TEE.

15. The system of claim 10, wherein the processing device is further to:

acquire an actual launch measurement (LM) of the third TEE from resources allocated to the third TEE;

acquire an actual LM of the second TEE using a secure channel (e.g., HTTPA); and verify, using the third TEE, an integrity of the second TEE based on the actual LM of the second TEE and the expected LM of the second TEE.

16. The system of claim 15, wherein the processing device is further to:

provide the actual LM of the third TEE to the second TEE responsive to verifying the integrity of the second TEE.

17. The system of claim 15, wherein to provide the actual LM of the third TEE to the second TEE causes the second TEE to send, to the client device, a second encrypted message indicating that the second TEE trusts the third TEE, and wherein the processing device is further to:

perform a remedial action indicating that the third TEE does not trust the second TEE responsive to verifying the integrity of the second TEE.

18. A non-transitory computer-readable medium storing instructions that, when execute by a processing device of a first service provider, cause the processing device to:

receive, by a cloud service provider, a request to provide a trusted service to a client device;

perform, by the processing device using a first trusted execution environment (TEE), a mutual attestation procedure with a second TEE to obtain a grant to execute a third TEE that is trusted by the second TEE;

calculate, using the first TEE, an expected launch measurement (LM) of the third TEE prior to initiating the execution of the third TEE;

generate, using the first TEE, an encrypted message;

register, using the first TEE, the expected LM of the third TEE and the encrypted message with the second TEE prior to initiating the execution of the third TEE;

initiate, using the second TEE, an execution of the third TEE responsive to obtaining the grant; and provide, using the third TEE, the trusted service to the client device, wherein the client device trusts the trusted service.

* * * * *